Patented Nov. 19, 1940

2,222,184

UNITED STATES PATENT OFFICE 2,222,184

GRAPHITE REFRACTORY ARTICLE

Raymond M. Shremp, Zelienople, Pa., assignor to Lava Crucible Company of Pittsburgh, Pittsburgh, Pa., a corporation of Pennsylvania No Drawing. Application September 19, 1939, Serial No. 295,620

12 Claims. (Cl. 106—9)

This invention relates to refractory articles such, for example, as crucibles, melting pots, and the like articles, more particularly to those composed of graphite, or of graphite and silicon carbide or similar refractory material.

A major object of the invention is to provide improved resistance in such articles to oxidation at elevated temperature more cheaply than heretofore.

A further object is to provide batches for making such articles which when fired develop a protective surface coating, or glaze, which is self-healing and is produced by cheap and readily available materials.

The invention is concerned with those refractory articles made from or containing substantial proportions of graphite, with or without silicon carbide and similar refractory materials, all of which may be designated for ease of reference as graphite articles, which possess residual carbon bond. It has been proposed heretofore to incorporate in the batches used for making these residual carbon bond graphite products materials such as ferro-chrome, Monel metal, German silver, magnesium, copper, ferro-manganese-aluminum-silicon, ferro-manganese carbide, and the like for the purpose of providing a material in the fired article which undergoes oxidation and reaction with other constituents of the batch with formation at the surface of the article of a glaze which more or less protects the underlying body from oxidation. Although protective glazes may be provided in various other ways, the protection is destroyed if their continuity is destroyed in the handling or use of the crucible, whereby the exposed portion is subjected to oxidation upon further use of the article. The advantage of the proposal just stated is that when the glaze is broken the metallic material contained in the underlying body will be oxidized with formation of further amounts of silicate glaze, so that the glaze is, in effect, self-healing.

I have discovered, and it is upon this that my invention is predicated, that graphite articles having residual carbon bond may be provided with such self-healing glazes more cheaply than has been possible heretofore, for example under the foregoing proposal, by the addition of an oxygen compound of manganese to the batches used in making such articles. I have discovered, in other words, that the presence of an oxygen compound of manganese in a residual carbon bond graphite refractory article produces a satisfactory protective glaze upon firing and use of the article which is self-healing should the glaze become broken at any point. Extensive investigation has shown that apart from the use of the metallic materials heretofore proposed, this property is apparently unique to oxygen compounds of manganese and to residual carbon bond articles. In other words, the same satisfactory results can not be obtained by the use of other metallic oxides such as those of lead, copper, nickel, chromium, zinc and the like. Similarly, the addition of these oxgyen compounds of manganese to clay bond graphite refractory articles seriously depreciates their strength.

Most suitably there is used in the practice of the invention an oxide of manganese. Satisfactory results have been obtained by the use of manganese sesqui-oxide ($Mn_2O_3$), but my investigations indicate that more satisfactory results are to be had with the use of the lower oxides of manganese, and manganese dioxide ($MnO_2$) now constitutes the preferred embodiment. Other compounds of manganese may be used, however, for example, manganese borate.

It is not necessary to use chemically pure or refined oxides of manganese in the practice of the invention because manganese ores such as pyrolusite, manganite, wad or hausmannite may be used. Likewise, there may be used silicate ores of manganese, such, for example, as braunite or bementite. For example, by the use of rhodonite ($MnSiO_3$) and of rhodochrosite ($MnCO_3$) I have obtained results which while not so good as those obtained by the use of manganese oxides are yet satisfactory for some purposes.

The exact reason why oxygen compounds of manganese act in this manner is not fully understood, but when used in batches for forming residual carbon bond graphite refractory articles they form during firing a glaze on the outer surface which protects the underlying carbonaceous material against oxidation and which is self-healing when the continuity of the glaze is disturbed. When this occurs the oxygen compound of manganese in the body underlying the exposed portion, which has remained unchanged up to this time, acts under the heat to which the article is exposed in use to heal the glaze. Thus the benefits of self-forming and self-healing glazes are obtained but through the use of cheaper materials than heretofore.

The invention is applicable generally in the production of graphite refractory articles having residual carbon bond, for which reason exact limits can not be stated for all of the ingredients which may be used in making batches for such purposes. However, by way of example it may be said that in the formation of refractory articles from mixtures of graphite and silicon carbide the batches may contain from about 25 to 55 per cent of flake graphite, and from 10 to 55 per cent of silicon carbide which may, for many purposes, comprise about 5 to 30 per cent of approximately 16-mesh and finer grain, and about 5 to 25 per cent of fines 150-mesh and finer. To the batch there may be added from about 5 to 30 per cent, based on the entire batch, of bonding agents which afford both a temporary binding action and produce a residual carbon bond when the article is burned.

The exact amount of the oxygen compound of manganese will depend likewise upon the particular compound and the composition of the batch. Thus, with a given batch different amounts of an ore might be required to produce the results obtainable from an equivalent amount of manganese oxide. However, for most purposes from 2 or 3 to 10 or 15 per cent of oxygen compound of manganese suffices for the purposes of the invention.

Articles formed from batches in accordance with the invention are fired in accordance with customary practice, i. e., by drying them and firing at a temperature to produce the residual carbon bond. Then they are fired at a temperature productive of the glaze.

As indicating how the batches may vary, they may contain also talc, steatite, or pyrophyllite added for the purpose of improving the working properties of the batch, for example as disclosed and claimed in Patent No. 2,104,841, granted January 11, 1938, on an application filed by Harold E. White. The oxygen compounds of manganese used in the practice of this invention have little, if any, effect upon the strength of the finished article as far as I have been able to determine, but if increased strength is desired there may be used silicon or the like as disclosed in the said Patent No. 2,104,841.

Not only is the use of an oxygen compound of manganese beneficial because it is productive of a satisfactory and self-healing protective glaze, but also, as indicated, it has no detrimental effect upon the strength of the article. As showing that satisfactory strength is attained, however, reference may be made to tests of a batch base comprising graphite, silicon carbide, feldspar, ferro-silicon, and pulverized pitch as the carbonizing bond. To different portions of this base batch there were added equal amounts of oxygen compounds of manganese, and test bars ⅝ inch square and 6 inches long were made from the batches in an ordinary screw press. These were dried at about 110° F., fired in a reducing atmosphere to 1400° F., and refired in an oxidizing atmosphere to 2500° F. The first fire cokes the carbon bonding agent while the second fire matures the glaze. The bars were then tested for strength at 2200° F. The moduli of rupture in such tests using various oxygen compounds of manganese were as follows:

| Oxygen compound of manganese | Modulus of rupture, p. s. i. |
| --- | --- |
| $MnO_2$ | 487 |
| Rhodochrosite | 400 |
| Rhodonite | 408 |

Crucibles made from batches of similar composition, using manganese dioxide in accordance with the invention, have been used in commercial practice. Their life in such use has substantially exceeded that of carbon bond graphite crucibles used theretofore in that plant, and apparently they will continue to function satisfactorily for a much longer period of time.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. As a new article of manufacture, refractory articles comprising graphite, residual carbon bond, and an oxygen compound of manganese, said article having in consequence of said oxygen compound of manganese a self-healing protective glaze.

2. As a new article of manufacture, refractory articles comprising graphite, residual carbon bond, and oxide of manganese, said article having in consequence of said oxygen compound of manganese a self-healing protective glaze.

3. A refractory article according to claim 1, said oxide being manganese dioxide.

4. As a new article of manufacture, refractory articles comprising graphite, silicon carbide, residual carbon bond, and an oxygen compound of manganese, said article having in consequence of said oxygen compound of manganese a self-healing protective glaze.

5. As a new article of manufacture, refractory articles comprising about 25 to 55 per cent of graphite, about 10 to 55 per cent of silicon carbide, residual carbon bond, and an oxygen compound of manganese in an amount to provide the article with a self-healing glaze.

6. A refractory article according to claim 5, said compound of manganese being an oxide.

7. A batch for making refractory articles comprising graphite, carbonaceous binder productive of residual carbon bond, and an oxygen compound of manganese, said compound of manganese being productive upon firing of the batch of a surface glaze which is self-healing in high temperature use of articles made from the batch.

8. A batch for making refractory articles comprising graphite, carbonaceous binder productive of residual carbon bond, and an oxide of manganese, said compound of manganese being productive upon firing of the batch of a surface glaze which is self-healing in high temperature use of articles made from the batch.

9. A batch according to claim 8, said oxide being manganese dioxide.

10. A batch for making refractory articles comprising graphite, silicon carbide, carbonaceous binder productive of residual carbon bond, and an oxide of manganese, said compound of manganese being productive upon firing of the batch of a surface glaze which is self-healing in high temperature use of articles made from the batch.

11. A batch for making refractory articles comprising about 25 to 55 per cent of graphite, 10 to 55 per cent of silicon carbide, carbonaceous binder productive of residual carbon bond, and an oxygen compound of manganese in an amount sufficient upon firing of the batch to form a surface glaze which is self-healing in high temperature use of the article made from the batch.

12. A batch according to claim 11, said manganese compound being manganese dioxide.

RAYMOND M. SHREMP.